(No Model.)

G. FLETCHER.
MORTISING CHISEL.

No. 435,538. Patented Sept. 2, 1890.

Attest
C. W. Benjamin
Chas. S. Scanlan.

Inventor.
George Fletcher
By W. F. Hapgood Atty.

UNITED STATES PATENT OFFICE.

GEORGE FLETCHER, OF BROOKLYN, NEW YORK.

MORTISING-CHISEL.

SPECIFICATION forming part of Letters Patent No. 435,538, dated September 2, 1890.

Application filed February 28, 1890. Serial No. 342,088. (No model.)

*To all whom it may concern:*

Be it known that I, GEORGE FLETCHER, a citizen of the United States, residing at Brooklyn, in the county of Kings and State of New York, have invented certain new and useful Improvements in Mortising Chisels or Knives, of which the following is a specification.

The chisels used in power mortising-machines have to be made quite thick in order to withstand the sudden shocks and heavy strains put upon them, and this necessitates a comparatively obtuse angle for the cutting-edge, which thus forms a thick wedge to be driven into the material operated upon. This wedge forces the cuttings downward and forward in the mortise being cut and compresses them into a hard mass that must afterward be removed from the mortise by hand by the use of a chisel and mallet.

The object of my invention is to produce a chisel or knife which will of itself remove all chips and cuttings from the mortise and leave it clear and complete when the work is removed from the mortising-machine, thus obviating the necessity for any hand-work to finish the mortise, and I attain this object by means of the chisel or knife illustrated in the accompanying drawings, in which—

Figure 2:
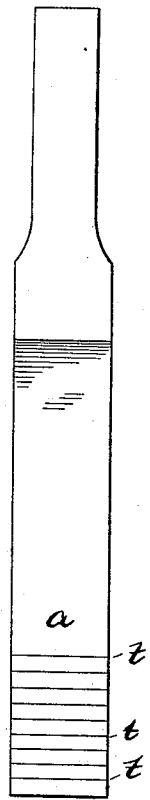
Figure 1:

Figure 1 is a side view of my improved chisel, and Fig. 2 is a front view of the same.

My invention consists in forming across the face of the blade *a* of a solid mortising-chisel several teeth *t t t*. The lower sides of these teeth are of a corresponding angle with that of the cutting-edge of the chisel, while the upper faces of the teeth I prefer to make at an angle slightly below the horizontal—that is to say, the upper faces of the teeth form an acute angle with the back of the chisel, so that the juncture of the upper face of one tooth with the lower face of the next tooth above it lies at a point below the working-edge of said lower tooth. With such a chisel the hook-shaped teeth readily grasp and withdraw the chips as fast as they are formed in the mortise. In the drawings I have shown a number of these teeth; but a smaller number will be sufficient for all ordinary work, and in practice I prefer to use but three teeth, unless the mortise is unusually deep. In operation, after the first cut the teeth *t t* engage with the cuttings, and as the chisel is withdrawn from the wood the teeth bring the chips with them, thus clearing the mortise as fast as it is formed.

I am aware that it is old in the art to construct a mortising-chisel with a longitudinal groove in its face extending the entire length of the chisel and having serrated teeth on opposite sides of said groove; and I am also aware that it is old to construct such a chisel with serrated teeth on its face near the lower end only of the chisel, said teeth having side or protecting guards of greater depth than they are, and I make no claim to such constructions, my invention being directed to features hereinbefore described, but particularly pointed out in the claims which follow.

I am also aware of British Patent No. 2,423 of 1853, and of the form of mortising-chisel illustrated in the drawings thereof, and I make no claim to a construction coming within the terms of the chisel therein described and shown.

My improved chisel differs from that disclosed in the aforesaid English patent in that the hook-shaped teeth will much more effectually withdraw the chips from the mortise than is possible with the form of teeth disclosed in said English patent.

What I claim, and desire to secure by Letters Patent, is—

1. A mortising-chisel having a series of serrations or teeth at its lower end only and extending entirely across the face thereof, said teeth having face inclinations parallel with the working-face of the chisel, and bottom inclinations making an acute angle with the back of the chisel, substantially as shown and described.

2. A mortising-chisel having a series of serrations or teeth at its lower end only, said serrations or teeth extending entirely across the face thereof, their lower faces lying in planes parallel with that of the working-face of the chisel, while their upper faces unite with the lower faces at points slightly below the working-edges, thereby forming hook-shaped teeth, substantially as shown and described.

GEORGE FLETCHER.

Witnesses:
 WM. BARKER,
 CHAS. S. SCANLAN.